March 10, 1964     W. R. R. PARK ETAL     3,124,476
METHOD OF COATING AN ORIENTED THERMOPLASTIC WEB
Filed June 16, 1961
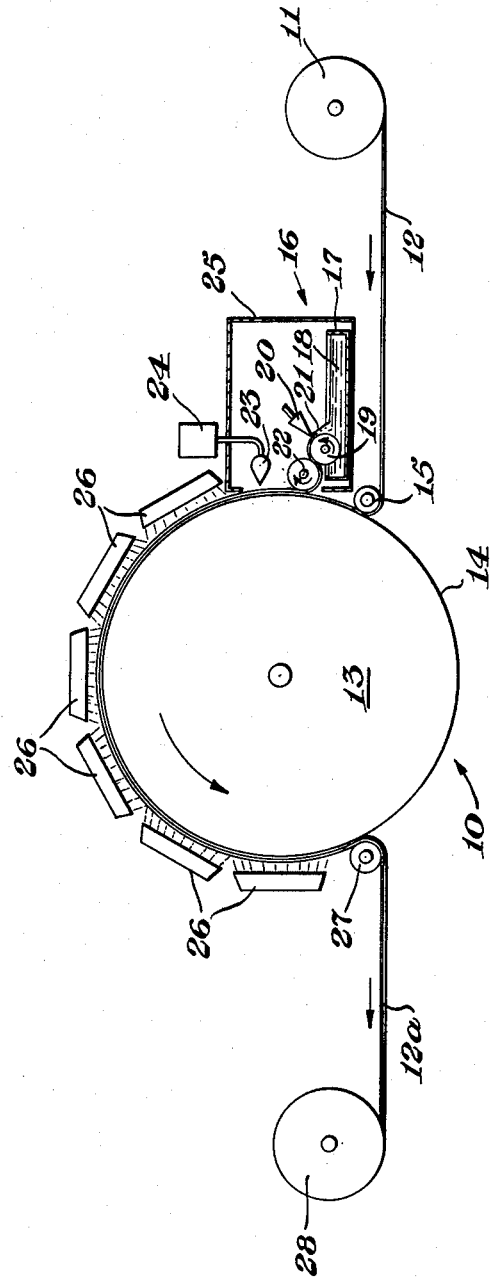
INVENTORS.
William R. R. Park
Herbert W. Heisterkamp
BY
AGENT

United States Patent Office 3,124,476
Patented Mar. 10, 1964

3,124,476
METHOD OF COATING AN ORIENTED
THERMOPLASTIC WEB
William R. R. Park, Midland, Mich., and Herbert W.
Heisterkamp, Cleveland, Ohio, assignors to The Dow
Chemical Company, Midland, Mich., a corporation of
Delaware
Filed June 16, 1961, Ser. No. 117,671
4 Claims. (Cl. 117—47)

This invention relates to an improved method of coating thermoplastic web and more particularly, relates to a method of coating oriented thermoplastic web which is heat shrinkable with a liquid coating composition.

Many thermoplastic resins may be processed by a wide variety of means into thin films or sheets. Quite often such materials by themselves are unsuitable for many desired end uses and their characteristics may be modified by the application of a suitable coating composition; for example, oriented polystyrene film does not heat seal readily and has a relatively high moisture vapor transmission rate. Polystyrene film may be transformed into a product which is commercially acceptable for a variety of applications requiring low moisture vapor transmission rates by the application of a thin coating of vinyl chloride vinylidene chloride copolymer material. Advantageously, such a coating is applied from a water dispersion of a copolymer latex. The water content of the freshly applied coating is relatively high and requires a considerable amount of heat to vaporize the water and use the small copolymeric particles into a thin coherent film. One substantial disadvantage in such an operation is the necessity for extremely close temperature control during drying operation. Conventionally, such thin films are dried as a substantially unsupported web; thus, if the temperature of the film during the drying operation is raised above the deorientation temperature of the substrate, it will tend to shrink, curl, stretch or otherwise deform in an undesirable manner. The coatings which may be applied to the material are limited by the deorientation temperature of the substrate and the quantity of water or similar dispersing medium is limited by the length of the drying chamber available. Because of the relatively slow drying rates of coatings having a low moisture permeability rather large low temperature drying ovens are conventionally employed with the disadvantages normally associated therewith. Conventionally, only relatively low drying rates are obtained in such processes when practiced with drying ovens of relatively small size.

It is an object of this invention to provide an improved rapid method for the coating of heat deorientable thermoplastic resinous film.

It is a further object of this invention to provide a method of coating a drying thermoplastic resinous film at a relatively high rate of speed.

It is yet a further object of this invention to provide a method of coating a thermoplastic resinous film with a uniform coat of an aqueous liquid dispersion.

It is a further object of this invention to prevent deorientation of a thermoplastic web while a coating applied thereto is being dried.

These benefits and other advantages are obtained in accordance with the invention by supporting a continuous web of oriented thermoplastic film by a generally cylindrical rotating surface maintaining said surface at a temperature in the range of from about 50 to 1 degrees centigrade below the deorientation temperature of said web, applying to the unsupported face of said web a liquid coating composition, drying said composition by applying heat to said coated face and removing said coated web from said cylindrical surface.

An apparatus in accordance with the invention comprises in cooperative combination a supply means for providing, a supply of a oriented organic thermoplastic web, a drum in association with means for internal heating thereof, said drum having a generally cylindrical exterior surface, means to hold said web in contact with said cylindrical surface of said drum, means to apply a coating to the surface of said web most remote from said cylindrical surface of said drum, immediately adjacent to said coating means to supply a planiform stream of gas to the coated surface of said web to smooth said coating, a radiant heating means so constructed and arranged so as to impinge radiant heat on the coated surface of said web and means to remove said web from said drum.

Further features and advantages of the invention will become more apparent in the specification and drawings wherein:

FIGURE 1 is a schematic representation of an apparatus generally designated by the reference numeral 10, adapted to practice the method of the invention. The apparatus 10 comprises a supply source 11 of oriented thermoplastic film or web 12. The web 12 is positioned against the generally cylindrical surface 14 of the drum 13 by the snubber roll 15. Positioned over the snubber roll 15 is a coating assembly generally indicated by the reference numeral 16. The coating assembly 16 comprises a trough or pan 17 containing a coating composition 18. In contact with the coating composition 18 is a pickup roll 19 having associated therewith a scraper or doctor 20 and a layer of coating composition 21. A transfer roll 22 is positioned between the surface 14 and pickup roll 19 and immediately above the roll 22 is an air knife or air doctor, 23 directed toward the surface 14 of drum 13. A gas supply 24 is provided for the doctor 23. The entire coating assembly 16 is partially enclosed by enclosure 25. A plurality of heating means 26 are peripherally distributed about the cylindrical surface 14 of the drum 13 carrying the film 12; snubber roll 27 serves to hold the dried coated film 12a against the surface 14 of the drum 13 and the film 12a is removed from the drum and wound on the take-up roll 28.

In operation of the apparatus and method of the invention thermoplastic web 12 is unwound from the supply source 11 and held against the surface 14 of the drum 13 by the snubber roll 15. Rotation of the drum 13 carries the film 12 by the offset printing assembly 16, wherein the coating composition 18 in pan 17 is carried in the form of the thin film 21 on the surface of the roll 19. A scraper or doctor blade 20 removes the excess coating and serves to smooth and evenly distribute the film over the roll 22. The film 21 of coating material 18 is transferred from the roll 19 to the roll 22 which is rotating in the opposite direction. The thin coating composition film 21 is transferred from the roll 22 to the film 12 which is in direct contact with the coated cylindrical surface 14 of the drum 13. As the freshly coated film moves upwardly a planiform air blast from the air knife 23 serves to further smooth coating material 21 into the uniform layer on film 12.

The film 12 initially contacts the surface 14 of the drum 13 at snubber 17. Heat is absorbed by the film 12 from its first contact with the surface 14 and evaporation of the liquid medium will commence immediately when the coating is applied by roll 22. In order to insure a uniform coating, it is oftentimes desirable to enclose the coating section 16 in a hood or similar isolating means and supply a highly humid atmosphere thereto. A humid atmosphere prevents drying prior to the smoothing operation performed by the air knife 23. As the film 12 is carried around the rotating drum 13, the wet coating 21 is subjected to the heat from the internally heated drum 13 and radiant heat from the heaters 26. The speed of the coating operation is readily adjusted to permit the coating layer 21 to dry prior to engagement by the snubber roll 27. The dry coated web 12a is then wound into the roll 28.

The temperature of the drum 13 employed will depend in part upon the characteristics of the particular thermoplastic material employed, the thickness of the coating, the desired coating rate, and the intensity of the heat supplied by the heaters 26. Generally, however, it is advantageous to maintain the surface 14 of the drum 13 at a temperature below the deorientation temperature of the film. Thus, if it is necessary to stop the process at any time, deterioration, fusion or shrinkage of the web will not take place. Beneficially, in certain cases, temperatures above the deorientation temperature of the web are employed. This is readily accomplished if operating conditions are adjusted carefully in such a manner that the cooling effect produced by the evaporation of the volatile liquid component in the coating composition maintains the temperature of the web 11 below its deorientation temperature. The offset printing technique employed to transfer coating layer 21 onto the web by the offset printing assembly 19 illustrated in FIGURE 1 is particularly advantageous as it permits very close control of the coating weight. The transfer is primarily dependent upon the mechanical factors such as clearance between the scraper 20 and the roll 19 and the relative speeds of rotation of the rolls 19 and 22.

The rheological properties of the coating material, within reasonable limits, are not a significant factor. Beneficially, the air knife 23 performs not a metering function as is usual, but only the function of smoothing the coating and reducing any unevenness which may result from the transfer of the material onto the film by the offset printing assembly 16. The use of the air doctor or knife 23 to perform only a smoothing function results in clear trouble-free operation by eliminating the usual tendency of the knife 23 to foul with coating composition.

A wide variety of coating materials are readily handled in this manner ranging from lacquers to aqueous resinous dispersions which are frequently referred to as synthetic latex. The operating temperature of the drum and the heaters for a given coating system for a given substrate will be somewhat dependent on speed as the heat transfer coefficient between drum surface 14 and the web 12 will be substantially constant. Beneficially the surface 14 of the drum 13 should have a smooth finish and preferably, mirror-like surface, and advantageously, a surface roughness of less than 10 microinches as specified by American Standards ASA B46.2–1952. Generally, if the temperature of the drum approaches the softening point of the web, the surface of the coated web held in contact with the drum will conform to the surface 14; thus, a high finish is required if a clear, transparent film is desired or a dull finish may be obtained if the surface of the drum is suitably etched, sand blasted, or otherwise roughened.

By way of further illustration, a polystyrene web 12 inches wide was coated and dried employing a drum about 30 inches in diameter, heated internally with hot water and at 85° centigrade having a mirror-like finish on the surface (about 10 microinches). An oriented polystyrene web 12 inches wide and about 1 mil in thickness was contacted with the drum in a manner substantially as shown in FIGURE 1. The web contacted the surface of the drum over an arc of about 270 degrees. An aqueous dispersion containing about 30 percent solids of a copolymer of vinylidene chloride and vinyl chloride was applied by an offset printing apparatus as shown in FIGURE 1. Six gas burners each having a maximum output of 30,000 British thermal units per hour were radially disposed about the cylindrical surface of the drum contacting the web. The dispersion was metered onto the surface of the web by the offset printing apparatus to produce a coating having a dry thickness of about 0.1 mil. An air knife was employed which was substantially as described in United States Patent 2,386,156 having a gap of .040 inch and an air supply pressure of 22 inches of water (gauge pressure) at a temperature of 39° centigrade. A smooth uniform dry coating was obtained when the apparatus was operated at a speed of 265 feet per minute. No tendency was observed for the polystyrene substrate to curl, stretch, or otherwise deform. Employing the same apparatus aqueous dispersions of resinous material are applied to film substrates prepared from polyethylene, polypropylene, and saran. No tendency was observed for deformation of any of the substrates employed when coated in accordance with the invention.

The method and apparatus of the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A method of coating an oriented thermoplastic web comprising supporting a continuous web of oriented thermoplastic film by a heated generally cylindrical rotating surface maintaining said web at a temperature in the range of from about 50 to about 1 degree centigrade below the deorientation temperature of said web, applying to the face of said web a dryable liquid coating composition, drying said composition by applying heat to said coated face and removing said coated web from said cylindrical surface.

2. The method of claim 1, wherein after coating and prior to significant drying, a planiform stream of gas is directed onto the freshly coated web to smooth said coating composition on the surface thereof.

3. The method of claim 1, wherein said web is polystyrene.

4. The method of claim 3, wherein said liquid coating composition comprises an aqueous dispersion of a copolymer of vinyl chloride and vinylidene chloride.

References Cited in the file of this patent

UNITED STATES PATENTS

| | | |
|---|---|---|
| 726,358 | Schumacher | Apr. 28, 1903 |
| 2,320,513 | Drummond | June 1, 1943 |
| 2,439,802 | Francis | Apr. 20, 1948 |
| 2,526,318 | Batten | Oct. 17, 1950 |
| 2,979,419 | Hill et al. | Apr. 11, 1961 |